United States Patent [19]

Auston et al.

[11] 3,792,379
[45] Feb. 12, 1974

[54] MILLIMETER WAVE DEVICES UTILIZING ELECTRICALLY POLARIZED MEDIA

[75] Inventors: David Henry Auston, Mountainside; Alastair Malcolm Glass, Millington, both of N.J.

[73] Assignee: Bell Telephone Laboratories, Incorporated, Murray Hill, Berkeley Heights, N.J.

[22] Filed: Mar. 7, 1972

[21] Appl. No.: 232,435

[52] U.S. Cl. .......... 332/7.51, 331/94.5 M, 350/147, 280/83.3 H
[51] Int. Cl. .............................. H01s 3/10
[58] Field of Search 332/7.51; 330/4.3; 331/94.5 M; 350/147, 150, 160; 280/83.3 H

[56] References Cited
UNITED STATES PATENTS
3,453,432  7/1969  McHenry ...................... 250/83.3 H OTHER PUBLICATIONS
Kohanzadeh et al., "Measurement of Law –Modes of a Laser," 7/70, pg. 475–477, IBEE., q.E.
Glass, "Investigation of $-Sr_{1-x}Ba_xNb_2O_6$-Pyroelectric Detection," pg. 4699–4713, J. Appl. Phys.,
Abrams, "Photomixing at 10.6 u –Pyroelectric Detectors," 10/15/69, Pg. 251–253, Appl. Phys. Lettr.

*Primary Examiner*—Benjamin A. Borchelt
*Assistant Examiner*—N. Moskowitz
*Attorney, Agent, or Firm*—G. S. Indig

[57] ABSTRACT

Radiative signals, e.g., pulses of duration as short as one picosecond or CW energy with frequencies as high as 10,000 GHz are radiated from pyroelectric media. Pump energy is in the form of electromagnetic radiation of wavelength within the range of one millimeter and shorter. The effect of such devices is to replicate the form of intensity variations of pump radiation whereby such variations take the form of pulses, modulation signals, difference frequencies, etc. Rapid response is, in a preferred instance, due to direct absorption of pump radiation at or below a low frequency absorption edge of a crystalline medium so that the energy is pumped directly into the lattice of the pyroelectric medium. An alternative arrangement takes advantage of the thermalization accompanying relaxation of an excited electron state. In the latter case the excited state may be that of a dopant material having an absorption within a normal transparency bandwidth of the pyroelectric medium.

23 Claims, 4 Drawing Figures

3,792,379

MILLIMETER WAVE DEVICES UTILIZING ELECTRICALLY POLARIZED MEDIA

BACKGROUND OF THE INVENTION

1. Field of the Invention

The invention is concerned with the generation of electromagnetic radiation either pulsed or continuous. Concerned frequencies are of the order of $10^{13}$ Hz to about $10^{10}$ Hz. Pulse length may range from of the order of $10^{-13}$ second down to about $10^{-10}$ second.

2. Description of the Prior Art

Pyroelectric media have been recognized for some years as of device utility; for example, for detection of electromagnetic radiation. Since at least until recently detection of such radiation of the near and far infrared spectrum was difficult much of the literature concerning pyroelectric detectors has been concerned with this wavelength range. Proposed uses of such detectors have often been concerned with demodulation of such radiation.

Until recently frequency response of pyroelectric detectors was limited to modulation frequencies of a maximum of the order of one or a few megahertz. Developments of consequence over the past two or three years have, however, identified the mechanistic source of such limitation and have largely succeeded in elimination of this limitation.

An early development during this period concerned the discovery that a particular material, mixed crystals of strontium niobate and barium niobate, was capable of frequency response well above the limitation suggested by early experimentation. See Vol. 13, *Applied Physics Letters* p. 147 (1968). Careful consideration of this result and related studies soon revealed that this particular composition showed an extremely high acoustic loss and it became apparent that prior art devices were frequency limited by piezoelectric oscillations accompanying volume changes due to heating and/or cooling. Such volume changes which tended to resonate at frequencies corresponding with mechanical resonance point swamped the true pyroelectric effect.

In a somewhat later development low acoustic Q values were imposed on an otherwise suitable pyroelectric media by mechanical clamping. Accordingly, materials such as lithium tantalate $LiTaO_3$ and others became available for use as a relatively high frequency pyroelectric detectors. See Vol. 41, *Journal of Applied Physics*, p. 4455 (1970). The prototypical pyroelectric detector utilizes evaporated or other contacting electrodes straddling the crystalline medium in a polar direction. The later developments described above continued to make use of this configuration. High frequency response, largely limited by available power and desired level of efficiency is, from a practical standpoint, considered to be in the range of about 1 gHz. Since such devices may be operated, baseband frequency multiplexing of infrared or other suitable radiation to the maximum indicated frequency is indicated. Considerable attention is being given to the development of such devices. Impetus is at least in part due to the fact that many laser oscillators are operative within the infrared spectra.

SUMMARY OF THE INVENTION

In accordance with the invention, pyroelectric media, either spontaneous or induced, are utilized in devices which operate as radiators of electromagnetic radiation within the frequency range of $10^{10}$ Hz to $10^{13}$ Hz. In addition to such CW capability, devices of the invention may radiate pulsed energy with pulse duration within the range of from about $10^{-10}$ second to about $10^{-13}$ second. Pump energy takes the form of radiation of wavelengths within the range of from one millimeter up. Pump energy may be pulsed, either quasi-continuous, i.e., containing a pulse train of many cycles in length, or may consist of one or a number of single pulse envelopes of duration again from $10^{-10}$ second to $10^{-13}$ second.

Mechanistic devices of the invention depend upon thermalization of input radiation with output current varying as the first time derivative of temperature change. This otherwise well known pyroelectric phenomenon is considered to operate on this unfamiliar time scale by reason of one or both of two factors:

1. In a preferred embodiment pump energy is absorbed directly into the absorbing species as vibrational or rotational energy, i.e., within the bandwidth limited at the short wavelength end as that defined as a lower frequency absorption edge. In the instance of crystalline media this takes the form of direct lattice absorption of pump energy. For certain media this may take the form of a mechanical agitation in a dipolar molecular species.

2. An alternative mechanism involves thermalization of excited electronic states. Species suitable for this latter approach are dipolar within the environment of the device and may be dopant materials or an inherent part of the pyroelectric medium. In the latter instance absorptions of concern are generally within bands commencing, at their short wavelength limit, with upper frequency absorption edges.

For a variety of reasons set forth below a preferred species in accordance with the invention utilizes direct spontaneous polarizable media with absorptions of concern occurring at or below a lower absorption edge so that irradiating energy is directly translated into vibrational lattice absorption. Such media may be single crystalline or polycrystalline. Since operation of the inventive devices is dependent upon net electrical polarization, use of polycrystalline materials implies the possibility of electric poling. Most commonly this is accomplished by cooling the material through a ferroelectric Curie point in the presence of a polarizing field. This of course suggests that polycrystalline pyroelectric media be ferroelectric at concerned operating temperatures unless a polarization-inducing field is to be maintained during use.

High frequency capability of devices of the invention is in part due to elimination of the conventional electrode structure and to utilization as direct radiators. This approach immediately avoids complicating effects of piezoelectric "ringing" (since mechanical resonant frequencies are only inefficiently radiated) and also avoids loss in efficiency involved in generation of millimeter waves and higher frequency waves due to the poor impedance coupling realizable with electrode structure. Radiator configurations may take the form of free space radiators or may be so arranged as to be coupled with dielectrically matched transmission lines. A form of the latter which involves an electrooptic line operated in the fashion of a Pockel's cell permits visual observation of the developed signal.

DETAILED DESCRIPTION

Figure 1:
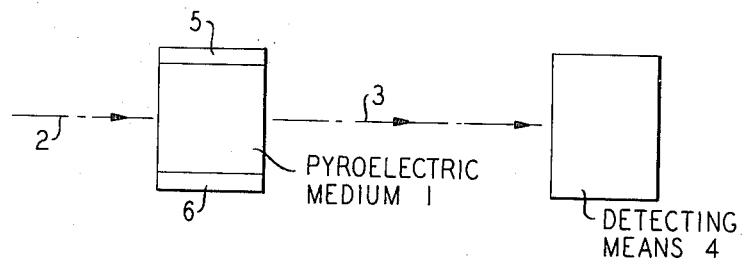
FIG. 1 is a schematic representation of an arrangement utilizing a free space radiator in accordance with the invention.

The arrangement of FIG. 1 includes a body 1 evidencing spontaneous or induced pyroelectricity, in the latter instance by electric field means not shown, provided with means for absorbing at least a portion of incoming radiation 2 so as to result in thermalization with development of concomitant radiation 3 in turn made incident on detecting means 4. Reflective coatings such as 5 and 6 desirably normal to polar faces, may be utilized to enhance radiator efficiency. As noted, absorption of radiation 2 may be by direct lattice absorption or equivalent in which event the means is such as to accommodate radiation within the wavelength band defined at its short end by a low frequency absorption edge of the pyroelectric medium. Alternatively, thermalization may be that which accompanies relaxation of an appropriate excited electronic state due either to a dopant species or to radiation within the band limited at its long wavelength end by a high frequency absorption edge of the medium itself. As described in some detail further on, radiation 3 is a replication of intensity variations in radiation 2. Such intensity variations may take a variety of forms, inter alia, separate pulse envelopes, modulated continuous or quasi-continuous wave energy, and difference frequencies due to beat signals developed by reason of simultaneous introduction of CW radiation of differing wavelengths.

Detecting means 4 may be either proximate or remote and may take a variety of forms, e.g., point contact, diodes, and photoconductive detectors. Either or both of elements 1 and 4 may include antennae, resonators or other arrangements for directing or amplifying signals.

Free space radiators operating in earth atmosphere have prescribed ranges which decrease sharply with increasing frequency. Accordingly, detecting means 4 may be considered as operating in a repeater with additional such element/s, not shown, operating as repeaters and detectors.

Figure 2:
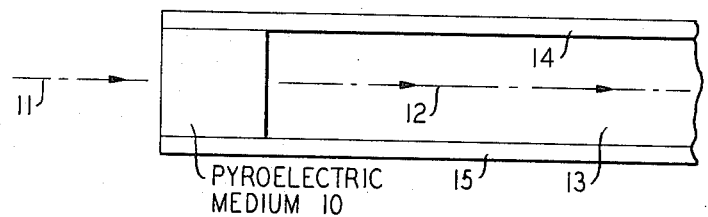
FIG. 2 is a schematic representation of a similar arrangement involving a transmission line.

The arrangement of FIG. 2 in common with other devices of the invention is dependent for its action on a body of pyroelectric medium 10 which may take any of the various forms discussed in conjunction with element 1 of FIG. 1 and elsewhere in this description. Again, excitation is the result of radiation 11, and again, the emitted radiative signal 12 may take any of the forms discussed. In this instance radiation 12 is introduced directly into transmission line 13 which is composed of a material having a dielectric constant closely matching that of body 10 or alternatively which is coupled to body 10 via an interface composed of appropriate layer/s of matching material/s. Transmission line 13 is, in accordance with a preferred embodiment, non-dispersive. For such purpose separated conductive strips 14 and 15 are so disposed longitudinally along the line as to result in propagation of a TEM mode. In one embodiment transmission line 13 may, as noted, be composed of electrooptic material which, by virtue of the induced birefringence accompanying radiation 12, may affect the transmission properties for plane polarized orthogonally directed radiation made incident on the line to permit a particular type of readout.

Figure 3:
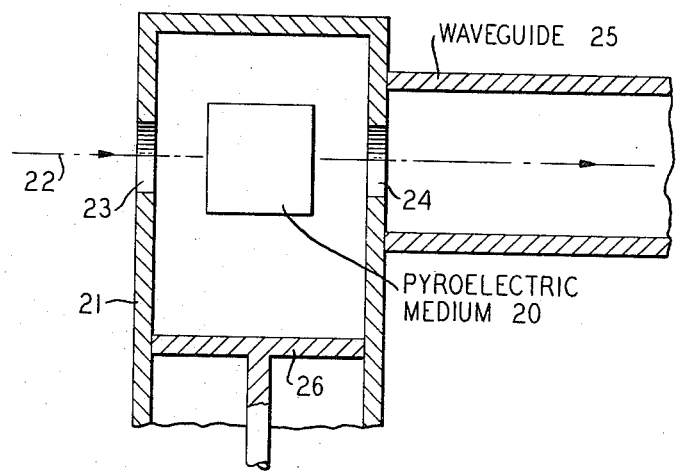
FIG. 3 is a schematic representation of an alternative arrangement utilizing a tunable cavity.

FIG. 3 depicts a pyroelectric medium 20 within an adjustable cavity 21. Operation of the device is in accordance with any of the modes discussed herein with pump radiation, represented by arrow 22, in this instance, being introduced through cavity orifice 23 and with output radiation emanating through cavity orifice 24. Emission may be into a waveguide structure, such as 25, or into free space. Cavity 21 is adjusted so as to be resonant usually for output radiation by means of plunger 26. While the resonator structure depicted is generally useful, its inherently narrow bandwidth makes it unsuitable for use where the intensity variation to be followed is in the form of a short pulse (i.e., several picoseconds or shorter).

Figure 4:
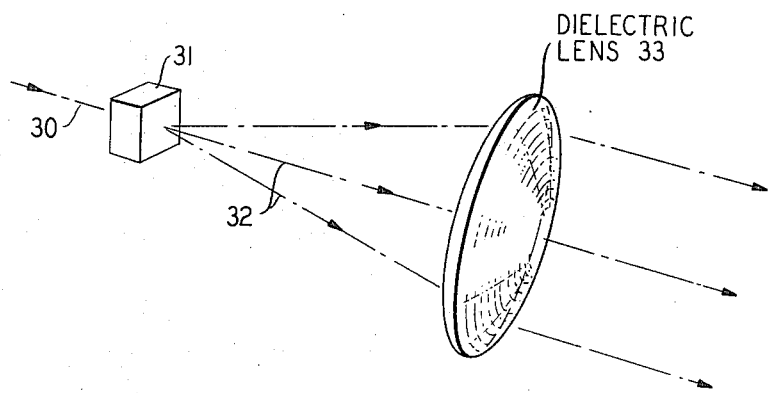
FIG. 4 is a schematic representation depicting still a different radiator design.

The device of FIG. 4 depicts an alternative radiator arrangement. In this instance, pump energy 30 is made incident on pyroelectric body 31 which, in turn, radiates energy 32. Radiation 32 is collimated or focused, as desired, by focusing means such as dielectric lens 33. The arrangement depicted is broad band and so may be utilized for any of the purposes set forth including pulse replication.

MATERIAL CONSIDERATIONS

A. Electrical Polarization

It has been indicated that a preferred medium is spontaneously polarized although induced electrical polarization may be utilized. Since the generated radiation is dependent upon a change in dipole moment a first requirement of any such medium is a significant macroscopic dipole moment. In general terms it may be stated that usable signal levels result where the medium exhibits a polarization of at least 0.1 microcoulombs per $cm^2$. Virtually all of spontaneously polarizable materials considered worthy of mention in the technical literature exhibit polarization of at least this magnitude. Examples are lithium tantalate $LiTaO_3$, lithium niobate $LiNbO_3$, KDP (potassium dihydrogen phosphate), triglycine sulfate, and GASH (guanadinium aluminum sulfate hexahydrate). The above materials are all ferroelectric at usual device operating temperatures and therefore exhibit a pyroelectric effect which may be evidenced either in poled single crystal or polycrystal form. True pyroelectric effect is also observed in a variety of materials not ordinarily designated as ferroelectric since they are not switchable under usual experimental conditions, and such materials will ordinarily be satisfactory for the inventive use only in single crystal form. An example of such a material is lithium sulfate monohydrate ($Li_2SO_4 \cdot H_2O$).

Polarization equivalent to that result in pyroelectric media of the type discussed above may be induced by application of an external electric field. Values equivalent to the minimum specified may result from application of an electric field of $10^5$ volts per centimeter applied across a material having a dielectric constant of the order of 10 or greater. Polarization values resulting in this manner are at least of the order of 0.1 microcoulomb per $centimeter^2$. Examples of media amenable to this approach include zirconium dioxide and rutile as well as fluid medium such as nitrobenzene, hydrogen chloride, and ammonia.

B. Absorbing Species

It has been indicated that the absorbing species may be the medium itself and that the preferred embodiment contemplates use of a pyroelectric medium in which absorption is at or below a low frequency absorption edge. Information relevant to this consideration from a design standpoint may be obtained from Vol. 24, *Analytical Chemistry*, P. 1253 (1952). Examples are lithium tantalate which has a lower frequency absorption wavelength band extending from about 8 micrometers to about 300 micrometers as well as strontium barium niobate, lithium sulphate monohydrate having lower frequency absorption between about 8 to 1,000 micrometers. Maximum absorption frequencies in this preferred embodiment are those resulting from hydrogen stretching and suitable materials having absorptions at wavelengths of the order of 2.5 micrometers and lower and hydrated materials such as $Li_2SO_4 \cdot H_2O$.

The alternative approach involves electronic excitation and is dependent on the thermalization attendant on the following relaxation (in lieu of the direct thermalization in the materials of the preceding paragraph). Species suitable for this approach may be dopant materials such, for example, as $Cu^{2+}$ contained within a polarized medium, e.g., $LiTaO_3$. Electronic excitation corresponding with absorption at or above an upper absorption edge may also be followed by sufficient rapid nonradiative electronic relaxation. Examples are CdS, $PbTiO_3$, and proustite evidencing upper absorption edges at about 0.5, 0.4, and 0.6 micrometers.

Lattice absorption corresponding with irradiation at wavelengths within the lower absorption band is generally preferred for two reasons: (1) thermalization takes place on a time scale of the order of $10^{-13}$ second so permitting the maximum frequency response of which devices of the invention are capable and, (2) absorption is generally at a high level so permitting use of chin sections in the irradiation direction. In general, however, such lattice vibrations (or vibrational and/or rotational modes introduced in some noncrystalline materials) generally occur at wavelengths no shorter than about one micrometer thereby imposing this limit on incoming carrier frequency. Higher carrier frequencies may be used with materials taking advantage of the alternative mechanism, i.e., relaxation of an excited electronic state. In the instance of dopant materials having absorptions within the normal transparency bands of typical materials, carrier wavelengths may be extended down to the order of 0.3 micrometer or lower. Relaxation from electronic states associated with an upper absorption edge may of course extend well into the ultraviolet band and beyond into the X-ray and gamma ray spectra. Unlike the preferred mechanism of direct lattice absorption or equivalent, however, this alternative mechanism is not necessarily inherently operative on a time scale suitable for the inventive purpose. Accordingly, while $Cu^{2+}$ has a relaxation time of the order of 30 picoseconds, $Cr^{3+}$ has a relaxation time from microseconds to milliseconds. Radiative energy corresponding with the lower CW limit of $10^{10}$ Hz with a pulse length limit of $10^{-10}$ second requires a relaxation time as short as of the order of $10^{-10}$ second.

Operation in accordance with the invention implies effective absorption of irradiation energy. This absorption is desirably at a minimal value of at least 5 $cm^{-1}$ (indicating that the radiation of concern is reduced to the fraction $1/e$ th of its incident value upon passage through 0.2 cm of medium (where $e$ is the natural logarithm base numerically equal to 2.718)). This absorption level is easily attained where use is made of irradiation within the band including a lower absorption edge. Where reliance is had upon a dopant species typical materials may manifest this absorption level by use of a dopant concentration of at least about 0.01 percent by weight. The absorption level is generally inherent for an absorption band including a high frequency absorption edge.

Absorbing dopant species may be atomic or molecular. Examples are set forth in a variety of standard texts, for example, *Ligand Field Theory* by Carl. J. Ballhauser, McGraw Hill, New York (1962); *Atomic Spectra of Molecules and Ions in Crystal* by Donald McClure, Academic Press, New York (1959); and *Luminescence of Organic Substances* by Landolt and Bornstein, Springer Verlag, Berlin (1967).

3. Operation Modes

Illustrative device embodiments are briefly described in conjunction with FIG. 1. All operations involve irradiation with electromagnetic radiation of a wavelength within an absorption band of the medium. Pump energy is ordinarily of a wavelength no longer than about one millimeter. It has been indicated that no upper limit can be prescribed. To produce an AC signal, it is necessary to impose an amplitude, variation on the radiation with the variation within the thermalization time scale. This time scale, which for the inventive purposes are prescribed as from about $10^{-13}$ second to about $10^{-10}$ second (the latter required for effective output radiation), may correspond with irradiation intensity variation resulting from the introduction solely of pulsed energy, of modulated CW energy, or by reason of the beat or difference frequencies resulting from introduction of two or more types of radiation. The latter is accomplished by introduction of two CW beams both, of course, within the absorption spectra of the medium, with a separation sufficiently close to result in a beat within the acceptable time scale. Since absorbing species ordinarily have absorption peaks at least 1.0 wave number ($cm^{-1}$) width, this expedient may result in beat frequencies ranging from 10 gHz to 30 gHz and higher. Operation with pump energy in an absorption band beyond an absorption edge permits even greater latitude.

Any of the arrangements discussed above may result in a signal which may serve as an information signal, as a carrier for information, or which may, in turn, be detected simply as a means of measuring the presence and magnitude of irradiating energy. The signal or carrier may then be transmitted to a near or remote point and thereby serve as a communication link; or, alternatively, it may serve as a demodulating or heterodyneing arrangement for information received on the incoming radiation.

Pulsed information is particularly interesting for certain functions and devices of the invention are capable of replicating "light" pulses of extremely short duration (of the order of as short as $10^{-13}$ second). Such pulses, producible for example by use of a mode-locked laser and possibly time multiplexed by means of an etalon, may serve a variety of purposes. For example, they may be utilized in a communication system, as in PCM, or they may perform a gating function, as, for example, by passage along an electro-optic transmission line so inducing a traveling pulse of induced birefringence which may, in turn, operate as a moving shutter for radiation affected by the birefringence. The invention resides generically in described method for the generation of electrical signals. Many uses in addition to those set forth are evident, for example, devices of the invention may serve in any matter analogous to that of a local oscillator in conventional circuitry.

4. Examples and Mechanistic Consideration

Example 1 — In this example, 10.6 micrometers infrared pulses of duration $10^{-10}$ seconds are used as a source to generate broad band electromagnetic radiation of frequencies up to $10^{10}$ Hz and higher. The absorbed species is strontium barium niobate. Such material, evidencing an absorption coefficient of at least 1,000 cm$^{-1}$ is cut and polished to produce a specimen having a thickness of 0.1 mm and a square cross section of 0.5 mm on a side. This specimen is placed in an open ended waveguide of cross section 0.400 by 0.800 inch having a low frequency cut-off of $7.5 \times 10^9$ Hz. The specimen is mounted with its polar axis parallel to the electric field vector of the $TE_{10}$ waveguide mode. The said source of infrared radiation is focused and incident on the specimen through the open end of the waveguide such that it is entirely absorbed within said specimen. The ensuing broad band radiation containing frequencies up to $10^{10}$ Hz and higher is then radiated from specimen directly into waveguide. Detection of such radiation is readily achieved by a microwave point contact diode, e.g., 1N 23B, mounted in the waveguide either in the immediate vicinity of the specimen or remotely at a location to where said radiation is received by transmission through a length of waveguide.

A peak infrared pulse power of 100 megawatts produces a total peak power of 1 kilowatt of electromagnetic radiation. The said device may be used either as a source of broad band radiation, or as a tunable source of narrow band radiation by the insertion of appropriate microwave filters into the waveguide transmission system. The latter case of spectral narrowing by filtering results in a proportionate decrease in peak power.

The short absorption depth of $10^{-3}$ cm or less, of the 10.6 micrometer source in the specimen, ensures that no adverse phasing effects arise in the generation of the said radiation.

The principal limitation of this device is the present availability of short infrared pulses. In anticipation of the development of shorter, e.g., $10^{-12}$ second pulses, this device is capable of generating broad band radiation of frequencies up to $10^{12}$ Hz and higher.

Example 2 — The following example involves development of an electrical signal responsive to the difference frequency due to beating of two incoming wavelengths of electromagnetic radiation, both within the lower absorption band of $TaO_3$. Incoming radiation of consequence includes two rotational lines emanating from a nominal 10.6 micrometer $CO_2$ laser. The signals are quasi CW, i.e., pulse length of the order of 200 nanoseconds with power levels of the order of 1 megawatt. A crystalline section of approximate dimensions of 1 mm by 1 mm by 0.1 mm, the latter dimension corresponding being about three times the absorption length for the $LiT_2O_3$, is mounted inside a 50 gHz waveguide. The output signal is an essentially pure 50 gHz carrier having a power level of 1 watt. Such radiation may then be utilized as communication carriers, in which event they are modulated, and the modulated or unmodulated signal may be detected by conventional means as, for example, by use of a point contact diode or InSb photoconductive detector.

Examples and the drawing have been described in terms of specific embodiments, so, for example, energizing means has generally consisted of one or more lasers operating CW or pulsed. By the same token, detecting means discussed only briefly have generally been concerned with prosaic devices readily available to illustrate the inventive effect. It has, however, been indicated that the mechanism of the invention may be utilized to a variety of ends. It is clear that energizing means may include incoherent radiation, in which event, the excitation may be responsive thermalization of a coherent component or to a modulation signal which, in such instance, would probably take the form of an amplitude variation. Excitation and detection positions may be proximate, as in the instance of a short haul communication system or gating apparatus for instrumentation, or may be remote, as in some communications systems. Accordingly, energizing means may take the form of an oscillator, e.g., a laser oscillator, an antenna of electronic or optical nature, a filter or lens system, etc. Detection means may take any form suitable to any of the purposes enumerated or otherwise apparent. As indicated, such detecting means may even include a local oscillator as for heterodyneing or other purpose, and such may, in fact, include a device working in accordance with the described exciting dipole mechanism.

What is claimed is:

1. Apparatus comprising a transducer for altering incoming electromagnetic radiation into outgoing electromagnetic radiation provided with first means for receiving radiation and second means for emitting the altered radiation, said incoming radiation having a maximum wavelength of about one millimeter, and manifesting a variation in input radiation intensity on a time scale of from about $10^{10}$ Hz to about $10^{13}$ Hz, said transducer being so adapted as to emit an electrical signal replicating said variation characterized in that said transducer consists essentially of a body which may manifest net electrical polarization and which manifests a maximum absorption length of about 0.2 millimeter for radiation of a wavelength within the said range, substantially the entirety of the altered radiation being due to a pyroelectric response resulting primarily from thermalization of that portion of the said incoming electromagnetic radiation which is absorbed, in which the said body has a polarization of at least 0.1 microcoulombs per centimeter$^2$ whereby the thermalization results in a change in dipolar moment corresponding with a net electrical signal responsive to the said variation of incoming electromagnetic radiation.

2. Apparatus of claim 1 in which the said incoming radiation includes a pulsed component.

3. Apparatus of claim 2 in which the incoming radiation consists essentially of the said pulsed component.

4. Apparatus of claim 3 in which a pulse is of duration of a maximum of about 100 picoseconds (such pulses containing spectral components of a frequency of up to at least about 10 GHz).

5. Apparatus of claim 1 in which at least a component of the said incoming radiation is at least quasi continuous, i.e., is CW for a period corresponding with many cycles.

6. Apparatus of claim 5 in which the said incoming radiation includes two frequencies.

7. Apparatus of claim 6 in which at least a part of the said variation in radiation intensity is the result of the difference signal developed from beating of the two said frequencies.

8. Apparatus of claim 7 in which the two said frequencies are separated by a frequency difference of a minimum of 10 GHz.

9. Apparatus of claim 1 in which the said electrical polarization is induced by a field external to the said body.

10. Apparatus of claim 1 in which the said polar environment is due to spontaneous polarization.

11. Apparatus of claim 10 in which the absorption is by an absorbing species which is a dopant contained within the said body.

12. Apparatus of claim 1 in which the said second means includes a transmission line.

13. Apparatus of claim 12 in which the said transmission line is essentially nondispersive.

14. Apparatus of claim 12 in which the said transmission line is provided with separated conductive elements so as to cause propagation of a TEM mode.

15. Apparatus of claim 14 in which the said transmission line is electro-optic.

16. Apparatus of claim 15 in which the said second means includes means for irradiating the said transmission line with radiation within the transparency bandwidth of the said transmission line in a direction orthogonal to the said electrical signal for at least a portion of the period of traversal of the altered energy within the said line so that the transmission properties of the said transmission line for the irradiating radiation are altered during the period of coincidence between the said altered energy and radiation incident on the transmission line due to the said irradiation.

17. Apparatus of claim 16 in which the said altered energy is detected as a response to the said change in transmission properties.

18. Apparatus of claim 12 in which the said transmission line is a waveguide.

19. Apparatus of claim 1 in which the electrical signal includes a carrier with an imposed modulation signal corresponding with at least a component of the said variation in radiation intensity.

20. Apparatus of claim 1 in which the said body is crystalline and exhibits spontaneous electrical polarization.

21. Apparatus of claim 20 in which the said first means is so arranged as to receive radiation of a wavelength within the absorption band lying below a lower absorption edge of the said body.

22. Apparatus of claim 20 in which the said body is doped with atomic species having an absorption falling within the natural transparency band of the said body, in which the outgoing radiation is primarily due to thermalization accompanying electronic relaxation from an excited electronic state associated with the absorption of the species and in which the said relaxation time is a maximum of $10^{-10}$ seconds.

23. Apparatus of claim 20 in which the said first means provides for incoming radiation of a wavelength within the band lying above the upper absorption edge of the said body and in which the outgoing radiation is primarily due to thermalization accompanying electronic relaxation from an excited electronic state associated with the absorption of the species and in which the said relaxation time is a maximum of $10^{-10}$ seconds.

* * * * *

UNITED STATES PATENT OFFICE
CERTIFICATE OF CORRECTION

Patent No. 3,792,379          Dated February 12, 1974

Inventor(s) David H. Auston and Alastair M. Glass

It is certified that error appears in the above-identified patent and that said Letters Patent are hereby corrected as shown below:

Column 2, line 49, change "suggestes" to --suggests--.

Column 6, line 24, change "Operation Modes" to --Operational Modes--.

Column 6, line 48, at the end of the line after "higher" insert a period.

Signed and sealed this 17th day of September 1974.

(SEAL)
Attest:

McCOY M. GIBSON JR.
Attesting Officer

C. MARSHALL DANN
Commissioner of Patents